(12) United States Patent
Liu

(10) Patent No.: US 12,432,478 B2
(45) Date of Patent: Sep. 30, 2025

(54) HEADPHONE THAT CAN EASILY REPLACE MULTIPLE COMPONENTS WITHOUT THE NEED FOR PROFESSIONAL TOOLS

(71) Applicant: Dongguan Beiou Intelligent Technology Co., Ltd., Dongguan (CN)

(72) Inventor: Yiyong Liu, Dongguan (CN)

(73) Assignee: Dongguan Beiou Intelligent Technology Co., Ltd., Dongguan (CN)

( * ) Notice: Subject to any disclaimer, the term of this patent is extended or adjusted under 35 U.S.C. 154(b) by 245 days.

(21) Appl. No.: 18/201,844

(22) Filed: May 25, 2023

(65) Prior Publication Data
US 2023/0388691 A1    Nov. 30, 2023

(30) Foreign Application Priority Data
May 25, 2022    (CN) .......................... 202221285968.X

(51) Int. Cl.
*H04R 1/10*    (2006.01)
*F21V 8/00*    (2006.01)

(52) U.S. Cl.
CPC .......... *H04R 1/1008* (2013.01); *H04R 1/1091* (2013.01); *G02B 6/0086* (2013.01)

(58) Field of Classification Search
CPC ................ H04R 1/1008; H04R 1/1091; H04R 2201/107; H04R 1/1058; H04R 1/1066; H04R 5/0335; G02B 6/0086
See application file for complete search history.

(56) References Cited

U.S. PATENT DOCUMENTS

| | | | | |
|---|---|---|---|---|
| 4,542,803 A * | 9/1985 | Houng | ................. | H04R 1/1058 181/129 |
| 5,117,464 A * | 5/1992 | Jones | ................... | H04R 1/1058 181/129 |
| 5,581,627 A * | 12/1996 | Bowser | ................ | H04R 5/0335 381/189 |
| 8,861,767 B2 * | 10/2014 | Lee | .......................... | H04R 1/10 381/370 |
| 9,301,066 B2 * | 3/2016 | Burleigh | ................ | H04R 15/00 |
| 9,685,917 B1 * | 6/2017 | Wun | ......................... | H03F 3/22 |
| 10,021,476 B2 * | 7/2018 | Kolton | ................. | H04R 1/1058 |
| 10,194,229 B2 * | 1/2019 | Toelle | .................. | H04R 1/1058 |
| 10,419,840 B2 * | 9/2019 | Lu | ......................... | H04R 1/1008 |
| 10,779,071 B2 * | 9/2020 | Wu | ........................ | H04R 1/105 |
| 2006/0159279 A1 * | 7/2006 | Kuo | .................... | H04R 1/1041 381/384 |
| 2007/0291974 A1 * | 12/2007 | Eisenbraun | .......... | H04R 1/1016 381/370 |

(Continued)

*Primary Examiner* — Oyesola C Ojo
(74) *Attorney, Agent, or Firm* — Bayramoglu Law Offices LLC

(57) ABSTRACT

A headphone that can replace multiple components without the need for professional tools includes two headphone bodies, which are connected together through headbands. A sheath is provided on the inner side of the headband facing the headphone body, and the end of the sheath is detachably connected to the headband. The bottom of one headphone body is connected with a power cord and a microphone, and the magnetic suction on the back side of the two headphone bodies is equipped with a decorative cover, The opposite side of the two headphone bodies is buttoned and equipped with earmuff.

9 Claims, 7 Drawing Sheets

(56) References Cited

U.S. PATENT DOCUMENTS

| | | | | |
|---|---|---|---|---|
| 2008/0166002 | A1* | 7/2008 | Amsel | H04R 1/026 381/370 |
| 2008/0279409 | A1* | 11/2008 | Hupkes | H04R 1/1066 381/370 |
| 2009/0252366 | A1* | 10/2009 | Johnson | H04R 1/1091 381/380 |
| 2010/0046782 | A1* | 2/2010 | Ito | H04R 5/0335 381/378 |
| 2012/0039481 | A1* | 2/2012 | McClain | H04R 1/1066 381/74 |
| 2012/0125360 | A1* | 5/2012 | Hill | A45D 8/36 132/275 |
| 2012/0324626 | A1* | 12/2012 | Torreggiani | H04R 1/1008 2/209 |
| 2014/0177884 | A1* | 6/2014 | Minarik | H04R 5/0335 381/309 |
| 2015/0071456 | A1* | 3/2015 | Steenkamp | H04R 1/1091 381/74 |
| 2015/0163581 | A1* | 6/2015 | Blonder | H04R 1/1033 381/384 |
| 2015/0289047 | A1* | 10/2015 | Greig | H04R 1/105 381/74 |
| 2016/0277828 | A1* | 9/2016 | Oh | H04R 1/105 |
| 2017/0171656 | A1* | 6/2017 | Toelle | H04R 1/1066 |
| 2019/0028796 | A1* | 1/2019 | Tang | H04R 1/1058 |
| 2019/0200130 | A1* | 6/2019 | Richardson | G06Q 30/0645 |
| 2019/0215593 | A1* | 7/2019 | Liu | H04R 1/105 |
| 2019/0289379 | A1* | 9/2019 | Wu | H04R 1/028 |
| 2019/0356976 | A1* | 11/2019 | Mobed | H04R 5/0335 |
| 2019/0379962 | A1* | 12/2019 | Navid | H04R 1/38 |
| 2020/0007974 | A1* | 1/2020 | Shymanovych | H04R 5/0335 |
| 2020/0162807 | A1* | 5/2020 | Lim | H01R 13/6205 |
| 2022/0312094 | A1* | 9/2022 | Tang | H04R 1/08 |
| 2024/0348966 | A1* | 10/2024 | Lin | H04R 1/1008 |

* cited by examiner

HEADPHONE THAT CAN EASILY REPLACE MULTIPLE COMPONENTS WITHOUT THE NEED FOR PROFESSIONAL TOOLS

CROSS REFERENCE TO THE RELATED APPLICATIONS

This application is based upon and claims priority to Chinese Patent Application No. 202221285968.X, filed on May 25, 2022, the entire contents of which are incorporated herein by reference.

TECHNICAL FIELD

The present disclosure relates to the field of headphone technology, in particular to a headphone that can replace multiple components without the need for professional tools.

BACKGROUND

Headphones, as the name suggests, are a type of earphone that is worn on the head rather than inserted into the ear canal. Unlike in-ear earphones, they are composed of two parts: a signal transmitter and earphones with signal reception and amplification devices. With the continuous improvement of living standards, our requirements for headphones are becoming higher and higher. With the development of technology, headphones have greatly developed, and their types and quantities are also increasing day by day, However, existing headphone accessories cannot be disassembled freely, such as the microphone, headband cover, headphone cover, etc. Usually, manufacturers fix these accessories with the headphone body during production and cannot disassemble them. Even if they can be disassembled, they need to go to a professional maintenance shop, and users cannot disassemble them according to their own needs, which brings inconvenience to users.

Therefore, it is urgent to design a headphone that can replace multiple components without the need for professional tools to overcome the shortcomings of existing technology.

SUMMARY

The technical solution adopted by the present disclosure to achieve the above technical objectives is: a headphone that can replace multiple components without the need for professional tools, characterized in that it includes: two headphone bodies, the two headphone bodies are connected together through a headband, the headband is facing the inner side of the headphone body with a sheath, and the two ends of the headband are respectively equipped with hook buckles, The end of the sheath is detachably connected to the hook buckle, and the bottom of one of the headphone bodies is equipped with a power port. The power port is connected to a power cord, and the bottom of the headphone body is also equipped with an audio port spaced between the power port. The audio port is connected to a microphone, and the magnetic suction on the back side of the two headphone bodies is equipped with a decorative cover, and the opposite side of the two headphone bodies is buckled with an earmuff.

In a preferred embodiment, the two ends of the sheath are respectively equipped with Velcro, and the two ends of the sheath are threaded into the hook buckle and fixed by the Velcro.

In a preferred embodiment, the two ends of the headband are respectively connected with ear hooks, and the end of the ear hook is rotatably connected to the side of the headphone body.

In a preferred embodiment, a light guide plate is installed on the back of the headphone body, and the light guide plate is located between the decorative cover and the headphone body. On the side of the light guide plate facing the headphone body, there are two first placement circles with intervals, and a first magnet group is arranged inside the first placement circle; The decorative cover is equipped with two second placement circles with intervals on one side facing the light guide plate. The second placement circle is equipped with a second magnet group, which is magnetically matched with the first magnet group.

In a preferred embodiment, the side of the light guide plate away from the headphone body is equipped with two positioning rings corresponding to the first placing ring, the diameter of the second placing ring is smaller than the diameter of the positioning ring, and the outer wall of the second placing ring is equidistant with several limit protrusions.

In a preferred embodiment, the microphone includes a pin and a socket internal model, where the socket internal model is connected to one end of the pin, the pin is inserted into the audio port at one end away from the socket internal model, and the outer end of the socket internal model connected to the pin is provided with a limit ring and a buckle block spaced with the limit ring.

In a preferred embodiment, the audio port is equipped with a hollow fixing piece, the tail end of the fixing piece is fixed inside the headphone body, the top end of the fixing piece is located inside the audio port, the top end of the fixing piece is equipped with a limit ring, and the top end of the fixing piece is also equipped with two spaced blocks, which are spaced with the limit ring, The opposite ends of the two fixture blocks are integrally connected to the limit ring.

In a preferred embodiment, the buckle blocks are provided with two opposing buckles located in the same horizontal plane. A groove is provided on the side of the buckle blocks facing the limit ring, and convex blocks are respectively provided on the side of the two buckle blocks facing the limit ring. The convex blocks are adapted to the groove.

In a preferred embodiment, the opposite side walls of the two headphone bodies are equipped with concave buckle grooves, and the bottom of the earbuds is equipped with a convex wall extending horizontally towards the center, which is adapted to the buckle groove.

In a preferred embodiment, the diameter of the audio port is 3.5 mm, and the power port is one of Micro USB interface, Type C interface, or Lightning interface.

The advantage of the present disclosure is that the sheath of the present disclosure is detachably connected to the headband through a hook buckle, achieving simple disassembly and installation of the sheath. At the same time, the power cord is connected electrically through a plug-in method, which can be easily replaced when the power cord is damaged, reducing the cost of use for consumers. Similarly, the microphone can be replaced according to their own needs through a plug-in design, And both installation and disassembly do not require the use of professional tools for disassembly and installation, improving the convenience of the product; The decorative shell is installed through magnetic suction, and can be disassembled by directly breaking it off when replacement is needed. The operation is simple and the firmness is guaranteed.

IN THE PICTURE

10. Headphone body; 11. Power port; 12. Audio port; 121. Fixtures; 122. Limit ring; 123. Fixture block; 124. Bulge; 13. Light guide plate; 131. First placement circle; 132. First magnet group; 133. Positioning ring; 14. Decorative cover; 141. Second placement circle; 142. Second magnet group; 143. Limit convex block; 15. Buckle groove; 16. Earmuffs; 161. Convex wall;

20. Headband: 21. Sheath; 22. Hook buckle; 23. Ear hook; 24. Velcro;

30. Power cord;

40. Microphone; 41. Pin; 42. Socket internal mold; 421. Limit ring; 422. Block buckle; 423. Card slot.

DETAILED DESCRIPTION OF THE EMBODIMENTS

In order to make the above purposes, features, and advantages of the present disclosure more obvious and understandable, the specific implementation methods of the present disclosure will be explained in detail below in conjunction with the accompanying drawings. Many specific details are elaborated in the following description to facilitate a full understanding of the present disclosure. However, the present disclosure can be implemented in many different ways from the other described herein, and those skilled in the art can make similar improvements without violating the connotation of the present disclosure. Therefore, the present disclosure is not limited by the specific embodiments disclosed below.

Figure 1:
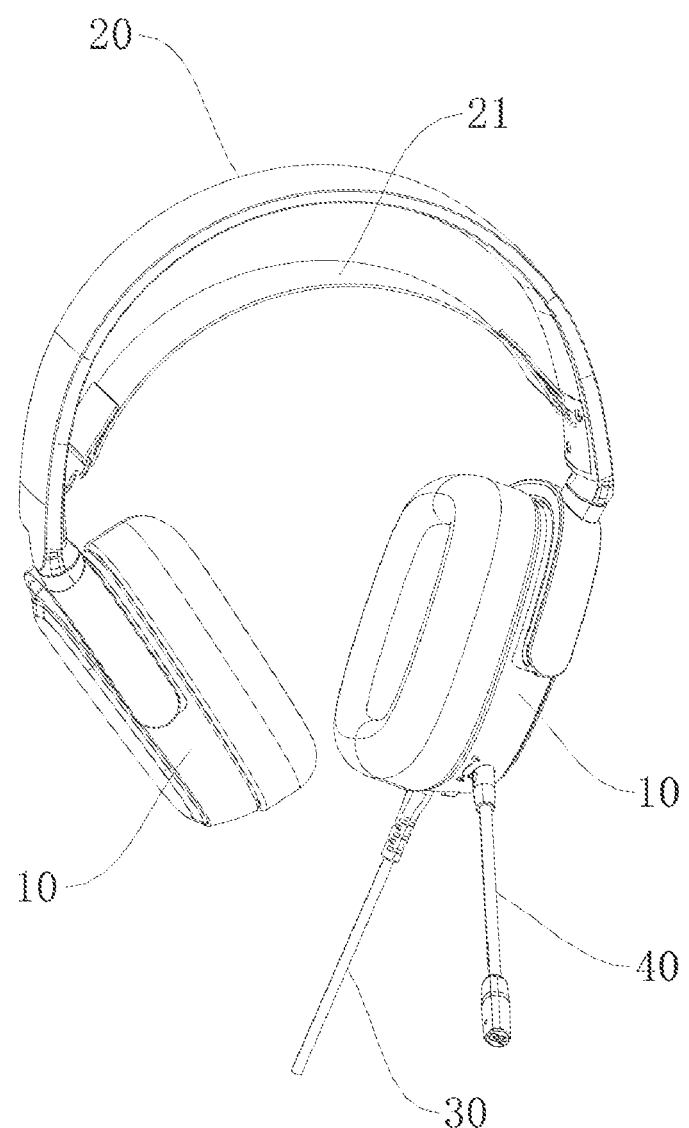
FIG. 1 is a structural schematic diagram of the present disclosure.
Figure 2:
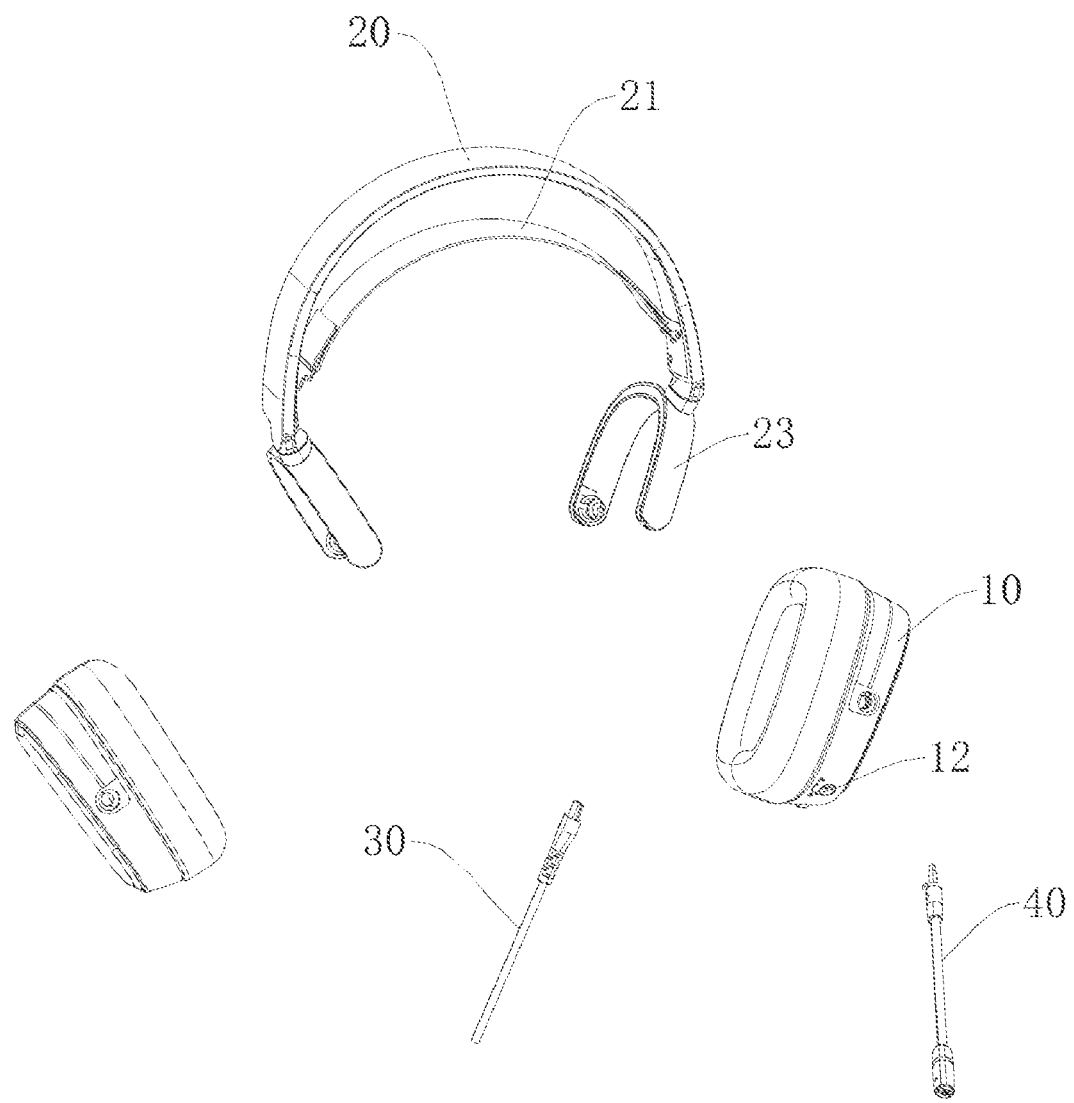
FIG. 2 is an exploded view of the present disclosure.
Figure 3:
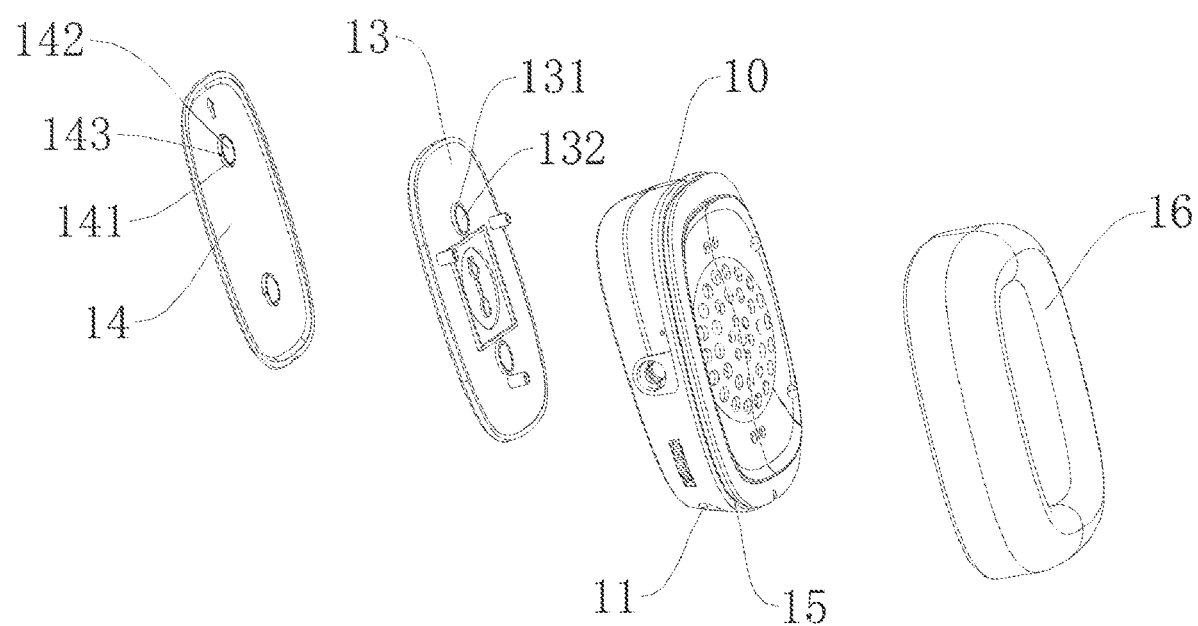
FIG. 3 is a first perspective exploded view of the headphone body of the present disclosure.
Figure 4:
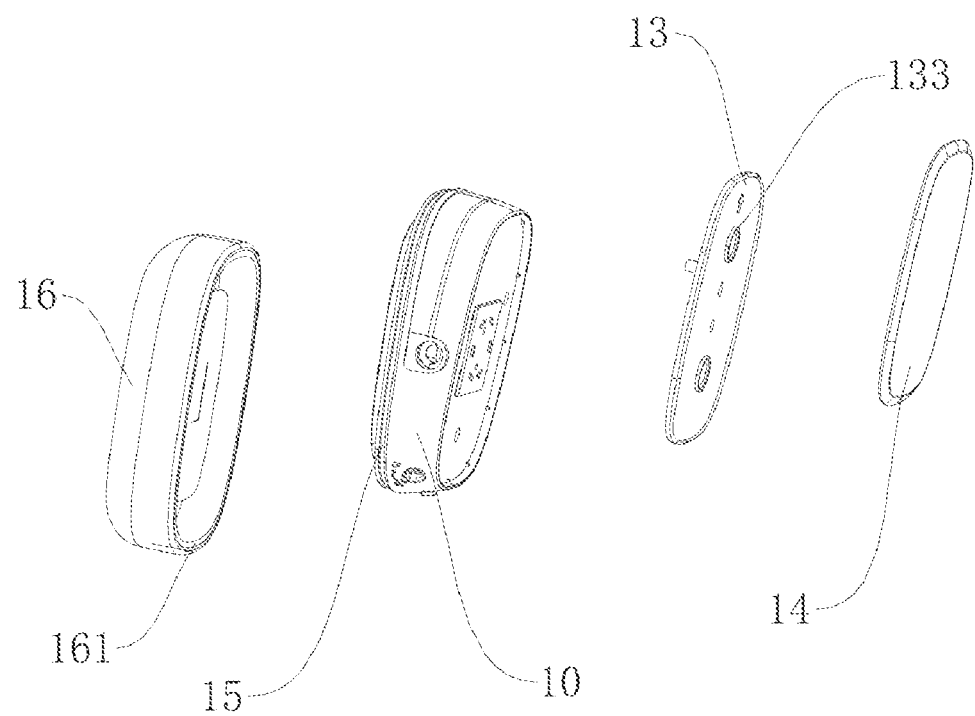
FIG. 4 is a second perspective exploded view of the headphone body of the present disclosure.
Figure 5:
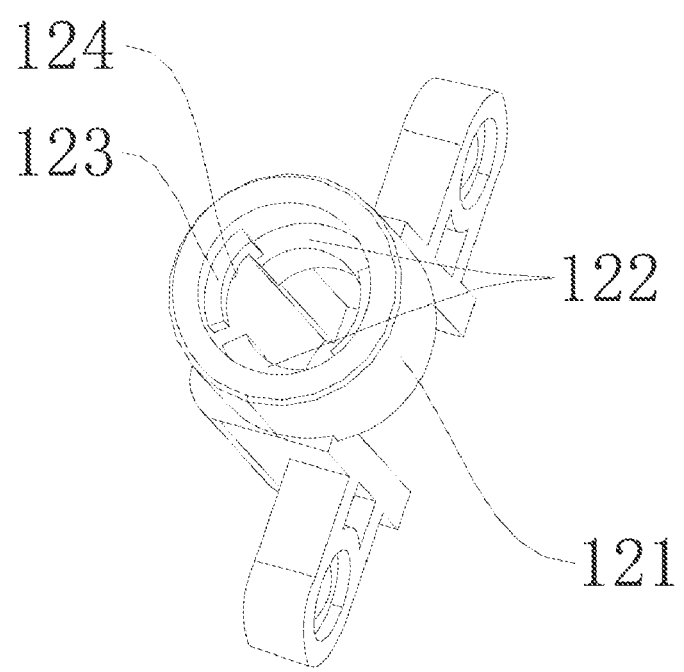
FIG. 5 is a structural schematic diagram of the fixed component of the present disclosure.
Figure 6:
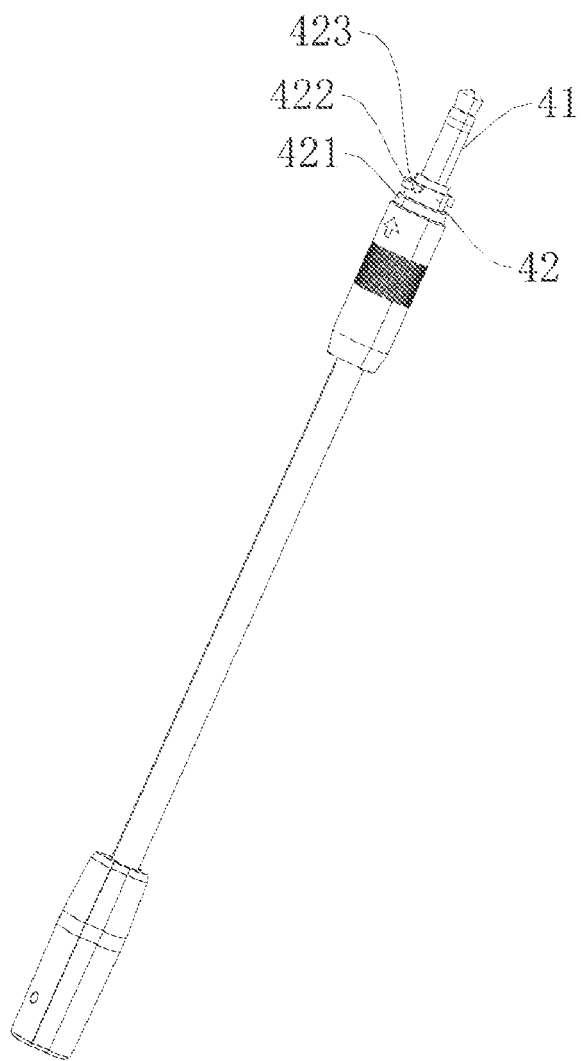
FIG. 6 is a schematic diagram of the structure of the microphone of the present disclosure.
Figure 7:
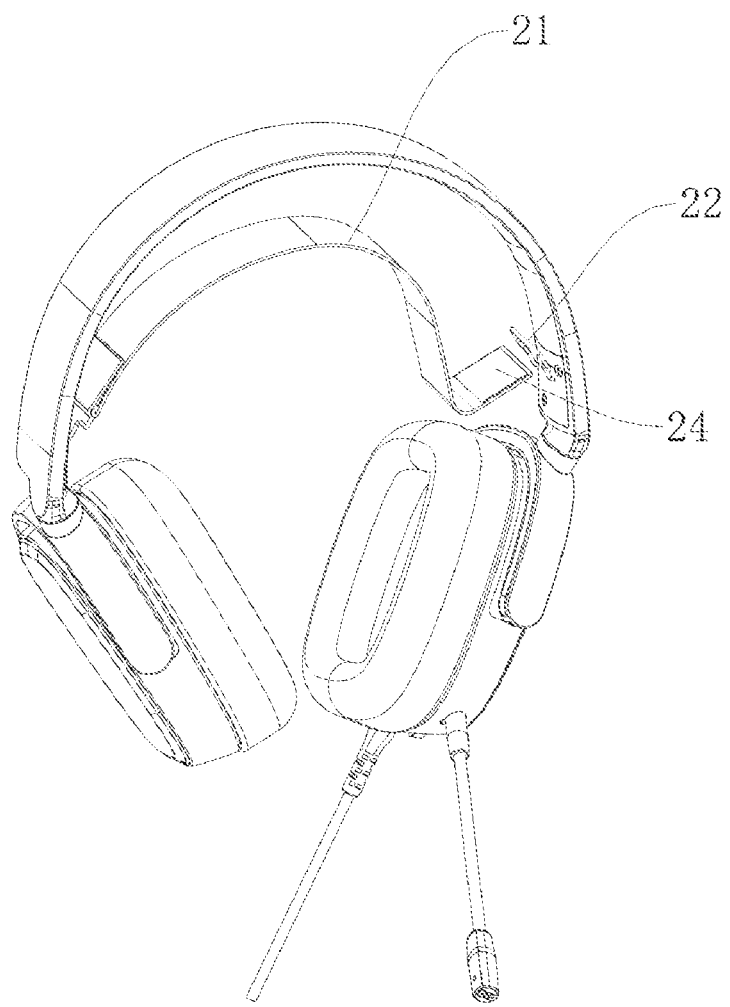
FIG. 7 is a schematic diagram of the structure of the headband of the present disclosure.

As shown in FIGS. 1 to 7, the present disclosure provides a headphone that can replace multiple components without the need for professional tools. It is characterized in that it includes: two headphone bodies 10, the two headphone bodies 10 are connected together through a headband 20, the headband 20 faces the inner side of the headphone body 10 and is equipped with a sheath 21, and the two ends of the headband 20 are respectively equipped with hook buckles 22. The end of the sheath 21 is detachably connected to the hook buckle 22, The bottom of one of the headphone bodies 10 is equipped with a power port 11, which is connected to a power cord 30. The bottom of the headphone body 10 is also equipped with an audio port 12 spaced apart from the power port 11, which is connected to a microphone 40. The magnetic suction on the back side of the two headphone bodies 10 is equipped with a decorative cover 14, and the opposite side of the two headphone bodies 10 is buckled together with an earmuff 16. Specifically, The sheath 21 can be detachably connected with the headband 20 through the hook buckle 22, so that the sheath 21 can be easily removed and installed. At the same time, the power cord 30 can be plugged to achieve electrical connection. At the same time, when the power cord 30 is damaged, it can be easily replaced. There is no need to replace the entire product with the traditional headphone, which reduces the use cost of consumers. The microphone 40 is also the same with the plug design, which satisfy consumers to replace according to their own needs, and there is no need to replace the entire headphones in case of damage. Both installation and disassembly do not require the use of professional tools for disassembly and installation, improving the convenience of the product; The decorative shell is installed through magnetic suction, and can be disassembled by directly breaking it off when replacement is needed. The operation is simple and the firmness is guaranteed.

Furthermore, in this embodiment, the two ends of the sheath 21 are respectively equipped with Velcro 24, and the two ends of the sheath 21 are threaded into the hook buckle 22 and fixed by the Velcro 24. Specifically, both ends of the sheath 21 are equipped with Velcro 24, which fixes the sheath 21 to the hook buckle 22. During installation, only one end of the sheath 21 needs to be threaded through the hook buckle 22, And the installation can be completed by bonding the end of the Velcro 24 and the body of the sheath 21 together. When disassembling, only the end of the sheath 21 needs to be pulled apart to complete the disassembly. With the development of technology, the existing Velcro 24 has strong adhesion, stable bonding force, and is not easy to loosen.

Furthermore, in this embodiment, the two ends of the headband 20 are respectively connected with ear hooks 23, and the end of the ear hook 23 is rotatably connected to the side of the headphone body 10. Specifically, the headphone body 10 is connected to the two ends of the headband 20 through the ear hook 23, and the ear hook 23 is set on the two ends of the headband 20. The ear hook 23 is U-shaped, and the two ends of each ear hook 23 are rotatably connected to the two sides of each headphone body 10, facilitating the adjustment of the angle of the headphone body 10, Improve comfort when wearing.

Furthermore, in this embodiment, a light guide plate 13 is installed on the back of the headphone body 10. The light guide plate 13 is located between the decorative cover 14 and the headphone body 10. On the side of the light guide plate 13 facing the headphone body 10, there are two first placement circle 131 with intervals, and a first magnet group 132 is located inside the first placement circle 131; The decorative cover 14 is equipped with two spaced second placement circle 141 on one side facing the light guide. The second placement circle 141 is equipped with a second magnet group 142, which is magnetically matched with the first magnet group 132. Specifically, the decorative cover 14 is installed on the back of the headphone body 10 through the magnetic coupling of the first magnet group 132 and the second magnet group 142. When the decorative cover 14 needs to be replaced, Simply buckle off the decorative cover 14 for replacement, and both the first magnet group 132 and the second magnet group 142 use strong magnets to ensure the firmness of the magnet. Users can replace the earphones at any time according to their needs, improving the product competitiveness of the earphones, improving the economic efficiency of the headphones, and meeting the user's usage needs. The replacement is simple and cost-effective, among which, the first placement circle 131 is used to place the first magnet group 132 and fix it to prevent contact between the first magnet group 132 and other components, causing the first magnet group 132 to detach from the light guide plate 13.

Furthermore, the side of the light guide plate 13 that is away from the headphone body 10 is equipped with two positioning rings 133 corresponding to the first placement circle 131. The diameter of the second placement circle 141 is smaller than the diameter of the positioning ring 133. The outer wall of the second placement circle 141 is equidistant with a radial limit convex block 143. Specifically, the side of the light guide plate 13 that is away from the first placement circle 131 is equipped with a positioning ring 133, The positioning ring 133 corresponds to the first placement circle 131, which is used to guide the placement of the second magnet group 142 and facilitate the correspondence between the second magnet group 142 and the first magnet group 132. The diameter of the second placement circle 141 is smaller than the diameter of the positioning ring 133, which facilitates the placement of the second placement circle 141 into the positioning ring 133. At the same time, to avoid the diameter of the second placement circle 141 being smaller than the diameter of the positioning ring 133 when the second placing ring 141 is located within the positioning ring 133, When the decorative cover 14 is installed on the headphone body 10, it is prone to movement due to the formation of pores. Several limit convex block 143 are equidistant on the outer wall of the second placement circle 141. When the second placement circle 141 is located inside the positioning ring 133, the limit convex block 143 are in contact with the inner wall of the positioning ring 133, thereby achieving fixation.

Furthermore, in this embodiment, the microphone 40 includes a pin 41 and a socket internal mold 42, which are connected to one end of the pin 41. The pin 41 is inserted into the audio port 12 at one end away from the socket internal mold 42, and the outer end of the socket internal mold 42 connected to the pin 41 is provided with a limit ring 421 and a block buckle 422 spaced with the limit ring 421. Specifically, A limit ring 421 and a block buckle 422 are arranged on the outer side of one end adjacent to the pin 41 of the socket internal model 42. The limit ring 421 is used to limit the depth of the pin 41 inserted into the audio port 12, and the block buckle 422 is used to limit the extraction of the pin 41.

Furthermore, the audio port 12 is equipped with a hollow fixtures 121, the tail end of the fixtures 121 is fixed inside the headphone body 10, the top end of the fixtures 121 is located inside the audio port 12, the top end of the fixtures 121 is equipped with a limit ring 122, and the top end of the fixtures 121 is also equipped with two spaced fixture blocks 123, which are spaced with the limit ring 122, The opposite ends of the two fixture blocks 123 are respectively integrated with the limit ring 122. Specifically, the fixture block 123 is equipped with two, and the two fixture blocks 123 are spaced apart. When the pin 41 needs to be inserted into the fixed block, twist the microphone 40 to make the block buckle 422 and fixture block 123 staggered. Then, press the pin 41 until the limit ring 421 presses against the fixture block 123. When the pin 41 cannot be pressed again, rotate the microphone 40, At this point, due to the integrated connection between one end of the fixture block 123 and the limit ring 122, the rotation angle of the microphone 40 is fixed and can only rotate at a predetermined angle. When the microphone 40 rotates to the limit angle, the block buckle 422 coincides with the fixture block 123. At this time, the block buckle 422 is located between the fixture block 123 and the limit ring 122. The block buckle 422 is limited by the fixture block 123 and cannot be pulled out, thus achieving a fixed connection.

Furthermore, the block buckles 422 are equipped with two opposite block buckles 422 located in the same horizontal plane. The side of the block buckles 422 facing the limit ring 421 is equipped with a card slot 423, and the side of the two fixture blocks 123 facing the limit ring 122 is equipped with bulge 124. The bulge 124 are adapted to the card slot 423, specifically to prevent the microphone 40 from rotating in the opposite direction due to accidental contact during use, Causing the block buckle 422 to detach from the fit with the fixture block 123, a card slot 423 is set on the side of the block buckle 422 facing the limit ring 421, and a bulge 124 is set on the side of the fixture block 123 facing the limit ring 122. The bulge 124 is adapted to the card slot 423. When the block buckle 422 overlaps with the fixture block 123, the bulge 124 is embedded in the card slot 423, restricting the rotation of the microphone 40, thereby achieving fixation and avoiding accidental contact that may cause the microphone 40 to detach from the fit with the audio port 12.

Furthermore, in this embodiment, the opposite side walls of the two headphone bodies 10 are equipped with concave buckle grooves 15, and the bottom of the earmuff 16 is equipped with a convex wall that extends horizontally towards the center. The convex wall is adapted to the buckle groove 15. Specifically, to facilitate the replacement of the earmuff 16, concave buckle grooves 15 are respectively provided on the opposite side walls of the two headphone bodies 10, and a convex wall that extends horizontally towards the center of the earmuff 16 is provided at the bottom of the earmuff 16, During installation, the convex wall is embedded into the buckle groove 15 to achieve the fixation of the earmuff 16. At the same time, because most of the earmuffs 16 are made of gum materials, the earmuff 16 has a certain degree of elasticity, making it easy for the convex wall of the earmuff 16 to be embedded into the buckle groove 15. At the same time, it is also convenient to detach the convex wall from the buckle groove 15 during disassembly.

Furthermore, in this embodiment, the diameter of the audio port 12 is 3.5 mm, and the power port 11 is one of the Micro USB interface, Type C interface, and Lightning interface. Specifically, the diameter of the audio port 12 is 3.5 mm, which enables the audio port 12 to adapt to most different types of microphones 40 on the market, improving its applicability. At the same time, the power port 11 is one of the Micro USB interface, Type C interface, and Lightning interface, In this embodiment, the Type C interface that is commonly used on the market is preferred. The headphones can be adapted to most power cords and can be replaced by power cords from other electronic products in case of emergencies.

In summary, the sheath 21 of the present disclosure is detachably connected to the headband 20 through a hook buckle 22, achieving simple disassembly and installation of the sheath 21. At the same time, the power cord 30 is connected electrically through a plug-in method, which can be easily replaced in case of damage to the power cord 30, reducing the cost of use for consumers. Similarly, the microphone 40 can be replaced according to their own needs through a plug-in design, And both installation and disassembly do not require the use of professional tools for disassembly and installation, improving the convenience of the product; The decorative shell is installed through magnetic suction, and can be disassembled by directly breaking it off when replacement is needed. The operation is simple and the firmness is guaranteed.

The present disclosure is not limited to the description in the specification and implementation methods, so it can easily achieve additional advantages and modifications for those familiar with the field. Therefore, without departing from the spirit and scope of the general concepts defined by the claims and equivalent scope, the present disclosure is not limited to specific details, representative devices, and the illustrated examples shown and described here.

What is claimed is:

1. A headphone allowed to replace a plurality of components without a need for professional tools, comprising two headphone bodies, the two headphone bodies are connected together through a headband, the headband is facing an inner surface of the headphone body with a sheath, two ends of the headband are respectively equipped with a hook buckle, and an end of the sheath is detachably connected to the hook buckle, a bottom of one of the two headphone bodies is equipped with a power port, wherein the power port is connected to a power cord;

the bottom of the headphone body is further equipped with an audio port spaced between the power port, wherein the power port is connected to a microphone; and a magnetic suction on each of back sides of the two headphone bodies is equipped with a decorative cover, and each of opposite sides of the two headphone bodies is buckled and equipped with earmuff;

wherein a light guide plate is installed on a back of the headphone body, and the light guide plate is located between the decorative cover and the headphone body:

a side of the light guide plate facing the headphone body is equipped with two first placement circles with intervals, and a first magnet group is arranged inside each of the two first placement circles;

the decorative cover is equipped with two second placement circles with intervals on one side facing the light guide plate; and each of the two second placement circles is equipped with a second magnet group, wherein the second magnet group is magnetically matched with the first magnet group.

2. The headphone according to claim 1, wherein two ends of the sheath are respectively equipped with Velcro, and the two ends of the sheath are threaded into the hook buckle and fixed by the Velcro.

3. The headphone according to claim 1, wherein the two ends of the headband are respectively connected with an ear hook, and an end of the ear hook is rotatably connected to a side of the headphone body.

4. The headphone according to claim 1, wherein a side of the light guide plate away from the headphone body is equipped with two positioning rings corresponding to the two first placement circles, a diameter of each of the second placement circles is smaller than a diameter of each of the two positioning rings, and an outer wall of each of the second placement circles is equidistant with a plurality of limit protrusions.

5. A headphone allowed to replace a plurality of components without a need for professional tools, comprising two headphone bodies, the two headphone bodies are connected together through a headband, the headband is facing an inner surface of the headphone body with a sheath, two ends of the headband are respectively equipped with a hook buckle, and an end of the sheath is detachably connected to the hook buckle, a bottom of one of the two headphone bodies is equipped with a power port, wherein the power port is connected to a power cord;

the bottom of the headphone body is further equipped with an audio port spaced between the power port, wherein the power port is connected to a microphone; and a magnetic suction on each of back sides of the two headphone bodies is equipped with a decorative cover, and each of opposite sides of the two headphone bodies is buckled and equipped with earmuff;

wherein the microphone comprises a pin and a socket internal model, wherein the socket internal model is connected to one end of the pin, and the pin is inserted into the audio port at an end far from the socket internal model, an outer side of one end connected to the socket internal model and the pin is equipped with a limit ring and a buckle block spaced with the limit ring.

6. The headphone according to claim 5, wherein the audio port is equipped with a hollow fixing piece, a tail end of the hollow fixing piece is fixed in the headphone body, a top end of the hollow fixing piece is located in the audio port, the top end of the hollow fixing piece is equipped with a limit ring, and the top end of the hollow fixing piece is further equipped with two spacing fixture blocks, the two fixture blocks are spaced with the limit ring, and opposite ends of the two fixture blocks are integrated with the limit ring.

7. The headphone according to claim 6, wherein the buckle block is equipped with two, and the two buckle blocks are arranged relative to each other in the same horizontal plane; and a side of each of the two buckle blocks facing the limit ring is equipped with a slot, and the side of each of the two buckle blocks facing the limit ring is equipped with convex blocks, wherein the convex blocks are adapted to the slot.

8. A headphone allowed to replace a plurality of components without a need for professional tools, comprising two headphone bodies, the two headphone bodies are connected together through a headband, the headband is facing an inner surface of the headphone body with a sheath, two ends of the headband are respectively equipped with a hook buckle, and an end of the sheath is detachably connected to the hook buckle, a bottom of one of the two headphone bodies is equipped with a power port, wherein the power port is connected to a power cord;

the bottom of the headphone body is further equipped with an audio port spaced between the power port, wherein the power port is connected to a microphone; and a magnetic suction on each of back sides of the two headphone bodies is equipped with a decorative cover, and each of opposite sides of the two headphone bodies is buckled and equipped with earmuff;

wherein an opposite side wall of each of the two headphone bodies is equipped with a concave buckle groove, and a bottom of the earmuff is equipped with a convex wall, wherein the convex wall extends horizontally towards a center, and the convex wall is adapted to the concave buckle groove.

9. The headphone according to claim 1, wherein a diameter of the audio port is 3.5 mm, and the power port is one selected from the group consisting of Micro USB interface, Type C interface, and Lightning interface.

* * * * *